INVENTOR.
James R. Mondt
BY
Paul Fitzpatrick
ATTORNEY ns of such.
United States Patent Office
3,187,803
Patented June 8, 1965

3,187,803
ROTARY REGENERATOR HAVING BELT DRIVE
James R. Mondt, Warren, Mich., assignor to General Motors Corporation, Detroit, Mich., a corporation of Delaware
Filed Mar. 22, 1963, Ser. No. 267,286
4 Claims. (Cl. 165—6)

My invention relates to rotary regenerators and particularly to improvements in the means for driving the matrices of such.

It is generally understood that a rotary regenerator is a heat exchange device in which a foraminous matrix is slowly rotated, part of the matrix being within a passage through which one fluid passes, and the remainder of the matrix being within a second passage through which a second fluid at a different temperature flows. Typical applications of such devices are as preheaters for furnace combustion air and as regenerators in gas turbine engines.

My invention is particularly applicable to gas turbine regenerators, although not limited thereto. The type of regenerator to which the invention preferably is applied is illustrated in U.S. Patents Nos. 2,838,248, 2,937,010, and 3,057,604. These patents show the structure and application of a regenerator having an annular radial flow matrix. The porous heat transfer material of the matrix is mounted between two end rings or rims which bear ring gears. The matrix is supported and located by rollers bearing against the rims and driven by pinions engaging the two ring gears.

There are disadvantages attendant upon the use of gearing in this environment, particularly in view of the cyclic temperature changes. In view of this, experiments have been made with friction drive of the matrix by the two pairs of rollers engaging the rims. This will work if both sets of rollers are driven so that there is complete synchronism, that is, exactly equal driving surface velocities of both. If there is not such synchronism, one pair of rollers will buck to some extent the other pair, and the drive is not satisfactory.

My invention involves a new approach to the problem of eliminating the drive gearing through the use of a frictional belt drive. By the use of a belt which is in contact with the matrix through a substantial arc, good driving contact over a relatively large area is provided and the problem of synchronization of the driving rollers is eliminated. Provision for free flow of gas through the radial-flow matrix may be achieved by using a porous or mesh belt, or by using a narrow belt at each rim, or a belt driving on only one rim.

The nature of the invention and its advantages will be clearer from the succeeding detailed description of preferred embodiments thereof and the accompanying drawings.

It will be understood that the drawings are not intended to explain fully details of regenerator structure which are not critical with respect to the present invention, are well-known to those skilled in the art, and may be ascertained, if desired, by reference to the patents noted above.

Figure 1:
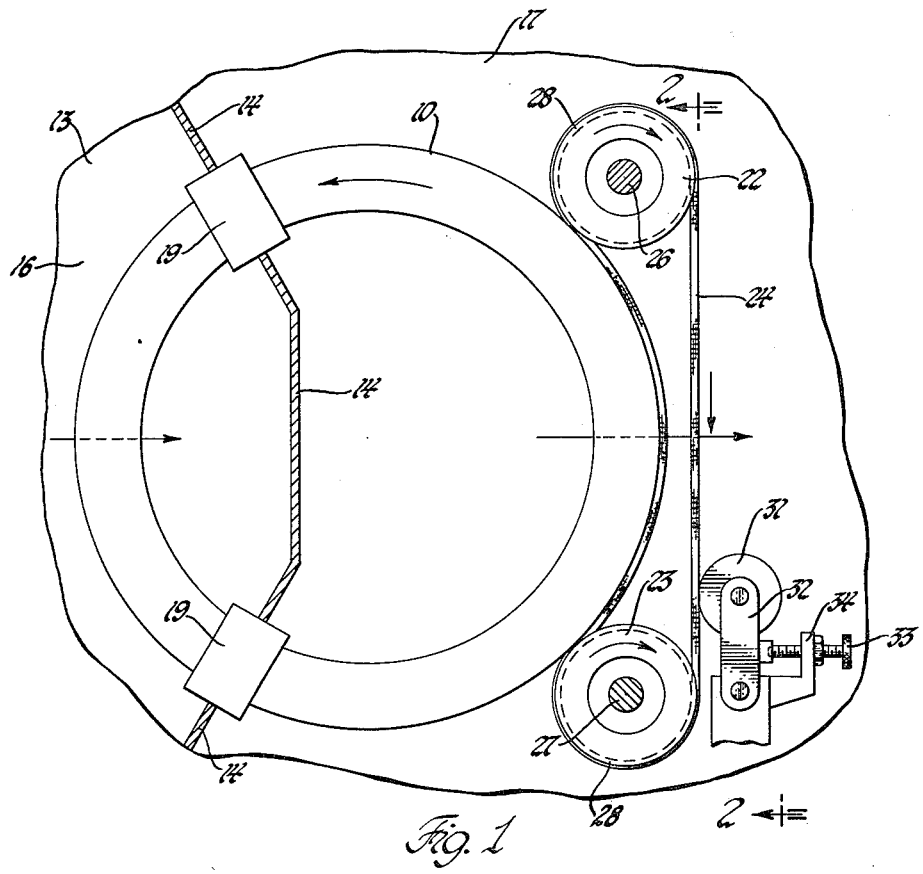
FIGURE 1 is a somewhat schematic view of a rotary regenerator embodying the invention, the view being taken on a plane perpendicular to the axis of rotation.
Figure 2:
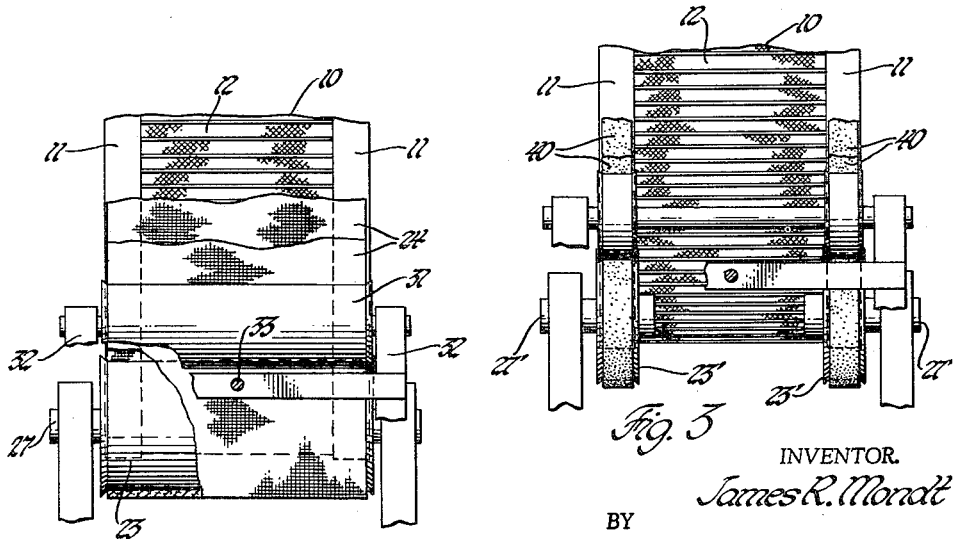
FIGURE 2 is a partial view, with parts cut away, taken in the direction indicated by the line 2—2 of FIGURE 1.

Referring to FIGURES 1 and 2, the regenerator comprises a matrix 10 of annular form and rectangular cross-section, the matrix having rims 11 at each end thereof, and a rigid body of porous heat exchange material 12 extending between the rims. The matrix is mounted within a housing indicated partially at 13. A bulkhead 14 divides the housing into a space 16 to which cool air under high pressure may be delivered by a compressor and a space 17 through which hot gas under low pressure is discharged by a turbine. The cool air flows radially inwardly through approximately one-third of the matrix; the hot gas flows outwardly through the remainder. The matrix is slowly rotated, as indicated by the arrow, and passes through main seals 19 in the bulkhead 14. Because of the lower pressure to the right of the bulkhead, the matrix is biased to the right as illustrated in FIGURE 1 toward supporting and driving structure which comprises a driving pulley or roller 22, an idler pulley or roller 23, and an endless flat porous or open-work belt 24. The driving pulley may be fixed on a shaft 26 slowly rotated by any suitable means, and the idler may be mounted upon a shaft 27. It will be noted that the pulleys 22 and 23 are preferably disposed some 60° to 90° apart with respect to the axis of the matrix so that a substantial portion of the belt is in frictional driving contact with the matrix. One or both of the pulleys may be flanged, as indicated by the flange 28 on pulley 22, so as to guide the belt. Any other suitable guide means may be used. The axis of matrix 10 is preferably located directly or indirectly by pulleys 22 and 23. That is, when running the matrix may be supported indirectly by the pulleys in a dynamic balance with the resultant biasing force acting to the right, as shown by the horizontal arrows, which bisects the space between the pulley axes. The matrix may press the belt against these pulleys, or it may be suspended in the slack of the belt so as to slightly clear the belt at the points where it passes over the pulleys. It is desirable, in most cases, to provide some means for adjusting the tension of the belt, such as an adjustable take-up pulley or an adjustment of the position of the idler shaft 27. If the pulleys are suitably spaced, the belt will be put in tension by the load imposed upon it by the matrix which, as previously stated, is biased to the right by the pressure differential across the matrix at the seals 19. An elementary take-up adjustment is illustrated in FIGURE 1. Take-up roller 31 mounted on a swinging arm 32 may be adjusted by a set screw 33 threaded through a bracket 34 on the housing.

In order to achieve full utilization of the matrix, the belt 24 in the installation of FIGURES 1 and 2 must be of an open-work or porous material such as, for example, a wire mesh or a well-perforated band. With an axial-flow matrix, this would not be necessary.

Figure 3:
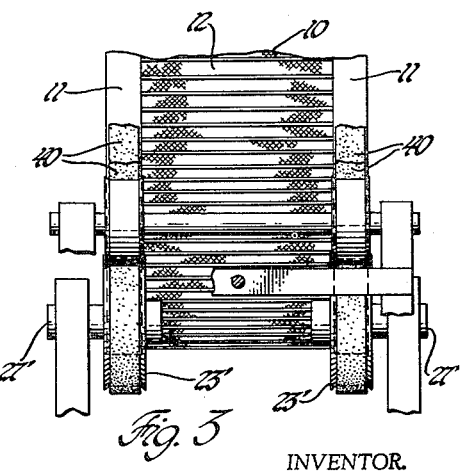
FIGURE 3 is a view similar to FIGURE 2 illustrating a modification.

It is also possible to use an imperforate belt if narrow belts engaging only the matrix rims are employed, as illustrated in FIGURE 3. FIGURE 3 shows the idler pulleys 23' mounted on shafts 27'. Two belts 40 are disposed one over each idler, and each passes over a driving pulley such as the pulley 26 illustrated in FIGURE 1. Obviously, the driving pulley may be a single wide pulley or separate narrow pulleys such as pulleys 23'. In some situations, it may be feasible to drive only one of the two rims of the matrix.

It will be apparent from the foregoing that the belt friction drive according to the invention will eliminate the problems involved in gearing and provide a substantial area of contact by the driving members and the matrix with only a single driving input fed to the shaft 26. The advantages of the invention will be apparent from this.

The detailed description of the preferred embodiment of the invention to illustrate the principles thereof is not to be regarded as restricting the invention since many modifications may be made by the exercise of skill in the art within the scope of the invention.

I claim:
1. In a rotary regenerator having a housing divided by a diaphragm defining separate flow paths for fluids at different pressures, an annular regenerator matrix rotat- ably mounted within the housing and extending into the flow paths, and sealing means on the diaphragm sealably engaging the matrix, providing clearance for movement of the matrix between the flow paths, and isolating the flow paths, the improvement comprising; friction driving means for the matrix engageable at the periphery thereof and including a driving pulley, an idler pulley, and a tensioned belt passing over the pulleys and disposed in frictional driving contact with the circumferential outer surface of the matrix throughout a substantial arc on the lower pressure side of the diaphragm, any difference in pressure between the fluids acting over the cross section of the matrix within the sealing means tending to bias the matrix toward the driving means and thereby increase the load on the friction driving means, the resultant biasing force acting substantially midway between said pulleys to balance the rotating matrix thereon and establish its rotational axis.

2. A rotary regenerator according to claim 1 wherein the resultant force acting to bias the matrix increases the load on the friction driving means tending to further tension the belt.

3. A rotary regenerator according to claim 1 wherein said driving and idler pulleys are pressed against the matrix and are substantially equidistant the sealing means.

4. A rotary regenerator according to claim 1 wherein said belt is formed of a foraminous structure allowing the free passage of fluid therethrough.

References Cited by the Examiner
UNITED STATES PATENTS

| 712,212 | 10/02 | Swinscoe | 74—239 X |
| 1,544,684 | 3/21 | Roesen | 72—221 X |
| 2,888,248 | 5/59 | Bubniak et al. | 165—9 |

CHARLES SUKALO, *Primary Examiner.*

MEYER PERLIN, *Examiner.*